Patented Sept. 11, 1951

2,567,814

UNITED STATES PATENT OFFICE 2,567,814

TETRAETHYL THIURAM DISULFIDE ALCOHOLISM TREATMENT COMPOSITION

Erik Jacobsen and Jens Hald, Copenhagen, Denmark, assignors, by mesne assignments, to Ayerst, McKenna & Harrison Limited, New York, N. Y.

No Drawing. Application March 26, 1948, Serial No. 17,377

3 Claims. (Cl. 167—55)

The present invention relates to therapeutic composites such as tablets, capsules, and packets containing ethyl thiuram for use in the treatment in the case of alcoholism, to methods of making such composites, and their utilization.

Alcoholism has become an increasing condition requiring some means for combating it. It is now well recognized as lying within the field of the physician and while many physicians deal with alcoholics, the physician to date has had practically no chemicals or medicines available for use for such purposes. Insofar as known, the only treatment for this purpose in which chemical therapeutics have been used, is in the so-called aversion treatment in which an attempt is made to produce an aversion to alcohol by administering apomorphine concomitantly with the drinking of alcoholic liquors, in order to induce emesis. Such treatment, however, has proved effective in cases of persons having a great suggestibility or auto-suggestion.

It is known that certain substances which are otherwise innocuous, will produce disagreeable symptoms when there is a consumption or intake of alcohol during the time when such substance is still present in the blood. Thus for instance, it has been found that after eating the fungus *Coprinus atramentarius*, Fries and Bulhard, which is otherwise innocuous, the organism is supersensitive to alcohol and will produce disagreeable symptoms where alcohol is taken with the meal. Disagreeable symptoms have also been found in certain cases with material which are not completely innocuous, as for example, calcium cyanamide. It is thus known that workers in calcium cyanamide works tend to be supersensitive to alcohol. But even the aforementioned materials have not been used for combating alcoholism.

Among the objects of the present invention is the production of therapeutic composites from readily available materials which may be utilized in the treatment and cure of alcoholism, such substances producing automatically disagreeable symptoms on the consumption or intake of alcohol within substantial periods of time after such materials have been administered.

Other and further objects and advantages including the production of such composites and their administration, will appear from the more detailed description set forth below, it being understood that such more detailed description is given by way of illustration and explanation only, and not by way of limitation, since various changes therein may be made by those skilled in the art without departing from the scope and spirit of the present invention.

In accordance with the present invention it has been found that after administration of suitable dosage of ethyl thiuram also known as tetraethyl thiuram disulfide, and bis (diethyl thiocarbamyl-disulfide) having the formula

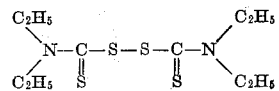

there is produced strong and very disagreeable symptoms on the consumption or intake of even small doses of alcohol for some time after the administration of the stated ethyl thiuram. The latter is quite innocuous itself. It is a solid substance forming colorless or slightly yellow crystals, melting at 70° C. It is almost insoluble in water but is soluble in chloroform, benzol, acetone, ether and strong alcohol; very slightly soluble in dilute alcohol.

Utilization of ethyl thiuram for the purposes stated has been found to give good results even in cases where the aversion treatment referred to above has been tried without result. The symptoms resulting from ingestion of alcohol after administration of the ethyl thiuram include for example: strong flushing of the face with increase of the skin temperature of the face; accelerated pulse and palpitation; slight decrease of blood pressure; slight feeling of asthma; occasional vomiting; general uneasiness.

The ethyl thiuram may be administered in any desired way and dosage but desirably is utilized as a therapeutic composite in the form of tablets, capsules, or powders, containing from 5 to 100 cgs. (centigrams). The substance may be admixed with solid diluents and/or tableting adjuvants such as starch, lactose, etc., gums, etc., and any of the tableting materials used in pharmaceutical practice may be employed where there is no incompatibility with the ethyl thiuram. The material may be tableted either with or without such adjuvants and/or diluents and utilized in the form of tablets. Or the material ethyl thiuram either alone or in admixture with solid diluents or other adjuvants may be placed in the usual capsule or resorbable material such as the usual gelatin capsule and administered in that way. Or powders of the ethyl thiuram either alone or in admixture with diluents and adjuvants may be put up into powder packets and employed. Or suspensions of the ethyl thiuram either alone or with solid diluents or adjuvants may be made in an inert medium such as water and utilized in the form of suspensions, emulsions, or dispersions, particularly in encapsulated form.

As an illustration of the manner of making tablets, the following example is given. 2.5 kilograms of tetraethyl thiuram disulfide are mixed with 7 kilograms wheat starch and 1.0 kilograms lactose after which a sludge of 1800 grams of wheat starch in water is added for the purpose of producing granules. After drying to remove water added for granulation purposes, 0.3 kilogram starch is added. The mixture is introduced into the tableting machine and from the quantity mentioned 10,000 tablets may be produced. In this event each tablet will contain about 25 centigrams of tetraethyl thiuram disulfide. Similarly tablets may be produced containing other dosage quantities.

The dosage ordinarily used will run from about 5 to 100 centigrams. In the treatment of chronic alcoholism, generally the following procedure may be followed. 1 gram of tetraethyl thiuram disulfide is administered, after which the patient is given some alcohol to test the effect produced. This will result in a strong reaction including some or all of the symptoms referred to above. Following this, 25 centigrams are administered twice a week, which result in maintenance of the hypersensitiveness. Even small doses of alcohol will produce a strong flushing giving the patient a mild warning which usually will be all that is necessary to prevent further indulgence in alcohol consumption even when strongly induced thereto by surrounding circumstances.

Doses of 1 gram a day produce no symptoms at all until an amount of alcohol exceeding approximately 10 grams alcohol be taken, which will produce marked symptoms of the kind mentioned above. The symptoms will remain for a few hours but will leave no harmful effect. This action after a dose of 1 gram will be produced during a period of 3–5 days and may be repeated.

Having thus set forth our invention, we claim:

1. A tablet for therapeutic use for treatment of alcoholism containing a solid diluent with an amount of from 5 to 100 centigrams of tetraethyl thiuram disulfide sufficient to constitute a dosage-unit for treatment against alcoholism.

2. A capsule of resorbable material for treatment of alcohlism containing a solid diluent with an amount of from 5 to 100 centigrams of tetraethyl thiuram disulfide sufficient to constitute a dosage-unit treatment against alcoholism.

3. A tablet for treatment of alcoholism composed of a major amount of wheat starch and a minor amount of lactose and containing a dosage-unit of from 5 to 100 centigrams of tetraethyl thiuram disulfide.

ERIK JACOBSEN.
JENS HALD.

REFERENCES CITED

The following references are of record in the file of this patent:

UNITED STATES PATENTS

| Number | Name | Date |
| --- | --- | --- |
| 1,972,961 | Tisdale | Sept. 11, 1934 |
| 2,279,421 | Tisdale | Apr. 14, 1942 |

OTHER REFERENCES

Hanzlik: Chem. Abstr., vol. 15, p. 3335 (1921).